United States Patent
Kodama et al.

(10) Patent No.: US 9,492,888 B2
(45) Date of Patent: Nov. 15, 2016

(54) WELDING POSITION DETECTING APPARATUS AND WELDING POSITION DETECTING METHOD FOR LASER BEAM WELDING

(71) Applicants: Toshifumi Kodama, Tokyo (JP); Koji Yano, Tokyo (JP); Masahito Suzuki, Tokyo (JP)

(72) Inventors: Toshifumi Kodama, Tokyo (JP); Koji Yano, Tokyo (JP); Masahito Suzuki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 394 days.

(21) Appl. No.: 14/364,146

(22) PCT Filed: Dec. 7, 2012

(86) PCT No.: PCT/JP2012/081811
§ 371 (c)(1),
(2) Date: Jun. 10, 2014

(87) PCT Pub. No.: WO2013/089038
PCT Pub. Date: Jun. 20, 2013

(65) Prior Publication Data
US 2014/0326705 A1 Nov. 6, 2014

(30) Foreign Application Priority Data

Dec. 15, 2011 (JP) ................................. 2011-274843

(51) Int. Cl.
*B23K 26/02* (2014.01)
*B23K 26/03* (2006.01)
(Continued)

(52) U.S. Cl.
CPC ........... *B23K 26/032* (2013.01); *B23K 26/042* (2015.10); *B23K 26/044* (2015.10);
(Continued)

(58) Field of Classification Search
CPC .... B23K 26/02; B23K 26/03; B23K 26/032; B23K 26/04; B23K 26/042; B23K 26/044; B23K 26/20; B23K 26/21; B23K 26/24; B23K 26/26; B23K 26/262; B23K 2201/04; B23K 2201/06; B23K 2203/02; B23K 2203/04; G06T 7/20; G06T 7/2066; G06T 2207/10; G06T 2207/10016; G06T 2207/10048; G06T 2207/30; G06T 2207/30108; G06T 2207/30136; G06T 2207/30152
USPC ............ 219/121.62, 121.63, 121.64, 121.78, 219/121.79, 121.82
See application file for complete search history.

(56) References Cited

U.S. PATENT DOCUMENTS 9,050,687 B2 * 6/2015 Tanaka ............... B23K 26/0884
2004/0069754 A1 * 4/2004 Bates ..................... B23K 26/03
219/121.63

(Continued)

FOREIGN PATENT DOCUMENTS

CN 102015193 A 4/2011
EP 2 022 595 A1 2/2009
(Continued)

OTHER PUBLICATIONS

May 20, 2015 Office Action issued in Korean Application No. 2014-7015978.
(Continued)

*Primary Examiner* — Christopher Kim
(74) *Attorney, Agent, or Firm* — Oliff PLC

(57) ABSTRACT

A welding position detecting apparatus for laser beam welding includes: an imaging device that captures, at a predetermined time interval, images of an irradiated portion of a welding material irradiated with a welding laser beam, and a surrounding area thereof, of a welding material; an image processing device that identifies a position of the irradiated portion irradiated with the welding laser beam by performing image processing calculating, from two or more images acquired by the imaging device, a direction and an amount of parallel movement of points in the images; and a display device that displays the position of the irradiated portion irradiated with the welding laser beam, the position being identified by the image processing device.

5 Claims, 8 Drawing Sheets

(51) Int. Cl.
*B23K 26/20* (2014.01)
*G06T 7/20* (2006.01)

(52) U.S. Cl.
CPC .......... *B23K 26/20* (2013.01); *B23K 26/262* (2015.10); *G06T 7/2066* (2013.01); *B23K 2201/06* (2013.01); *B23K 2203/04* (2013.01); *G06T 2207/10016* (2013.01); *G06T 2207/10048* (2013.01); *G06T 2207/30136* (2013.01); *G06T 2207/30152* (2013.01)

(56) References Cited

U.S. PATENT DOCUMENTS

| | | | |
|---|---|---|---|
| 2004/0134891 A1* | 7/2004 | Schumacher | B23K 26/242 219/121.63 |
| 2006/0011592 A1* | 1/2006 | Wang | B23K 26/032 219/121.64 |
| 2007/0012665 A1* | 1/2007 | Nelson | H05K 3/0038 219/121.69 |
| 2010/0206856 A1 | 8/2010 | Tanaka et al. | |
| 2011/0297654 A1* | 12/2011 | Yoshikawa | B23K 26/046 219/121.62 |
| 2012/0138586 A1* | 6/2012 | Webster | A61B 18/20 219/121.64 |
| 2013/0341310 A1* | 12/2013 | Van Der Wilt | C30B 13/24 219/121.62 |
| 2014/0312013 A1* | 10/2014 | Frankel | B23K 26/04 219/121.68 |
| 2015/0076126 A1* | 3/2015 | Fikes | B23K 37/0235 219/121.81 |
| 2015/0144606 A1* | 5/2015 | Roos | B23K 26/032 219/121.64 |
| 2015/0158123 A1* | 6/2015 | Kyoto | B23K 26/36 219/121.73 |
| 2015/0360319 A1* | 12/2015 | Yagi | B23K 26/262 219/121.64 |
| 2015/0371911 A1* | 12/2015 | McWhirter | H01L 22/26 438/7 |
| 2016/0067832 A1* | 3/2016 | Kobayashi | B23K 26/03 219/121.83 |
| 2016/0151859 A1* | 6/2016 | Sparks | B23K 26/342 219/121.62 |
| 2016/0221120 A1* | 8/2016 | Narita | B23K 26/0665 219/121.78 |

FOREIGN PATENT DOCUMENTS

| | | |
|---|---|---|
| JP | B2-55-18439 | 5/1980 |
| JP | A-7-38842 | 2/1995 |
| JP | H09-29435 A | 2/1997 |
| JP | A-2000-263266 | 9/2000 |
| JP | A-2001-263993 | 9/2001 |
| JP | 2002120066 A | 4/2002 |
| JP | 2006-082129 A | 3/2006 |
| JP | A-2008-87028 | 4/2008 |
| JP | A-2010-184273 | 8/2010 |
| JP | 4777856 B2 | 9/2011 |

OTHER PUBLICATIONS

Dec. 31, 2014 Office Action issued in Chinese Application No. 201280061732.0.
Apr. 5, 2016 extended Search Report issued in European Patent Application No. 12857094.2.
Horn et. al., "Determining Optical Flow," *Artificial Intelligence*, 1981, vol. 17, pp. 185-203.
International Search Report issued in PCT/JP2012/081811 mailed Mar. 12, 2013 (with translation).

* cited by examiner

WELDING POSITION DETECTING APPARATUS AND WELDING POSITION DETECTING METHOD FOR LASER BEAM WELDING

FIELD

The present invention relates to a welding position detecting apparatus and a welding position detecting method for laser beam welding that uses a laser beam as a concentrated heat source to weld abutting portions (a seam) of a welding material.

BACKGROUND

Available as one of methods for manufacturing a welded steel pipe is a process for manufacturing a steel pipe product by continuously supplying a steel strip and forming the steel strip into a cylindrical shape by abutting and welding both edges of the steel strip together. Electric resistance welding (an ERW process) was very often used as a welding method in the abovementioned manufacturing process. Lately, however, laser beam welding that uses a laser beam as a heat source has come to be used more often. The development of laser beam welding machines having an oscillation wavelength shorter than that of the conventional gas-oscillating laser (gas laser), such as a semiconductor laser and a fiber laser, allows occurrence of reduction in efficiency to be reduced, the reduction in efficiency occurring due to, for example, generation of plasma as a result of an interaction between a vaporized metal workpiece to be welded and the laser in the laser beam welding method. This results in an increasingly widespread use of the laser beam welding method.

The laser beam welding method requires accurate positioning to ensure that an irradiation point of the laser beam falls on the abutting portions at all times. In the continuous steel strip forming process, however, the abutting position of the steel strip tends to fluctuate due to, for example, conditions of a manufacturing line and a heat input. To accurately control the irradiation point of the laser beam, therefore, techniques have been researched and developed for continuously detecting the irradiation point of the laser beam at the laser beam welding portion.

One known method for detecting the welding position in the laser beam welding incorporates a television camera that directly observes the welding portion (near the laser beam irradiation point) to thereby detect a central position of the abutting portions and a molten pool (see Patent Literature 1). In this welding position detecting method, the position of external illumination is designed such that the welding portion is irradiated with illumination from the external illumination so that the molten pool is brightly observed, while the abutting portions are dimly observed. A luminance pattern of the observed image is then binarized to thereby detect the central position of the abutting portions and the molten pool.

Another known method for detecting the welding position in the laser beam welding incorporates an imaging device that images light reflected from the welding portion (near the laser beam irradiation point) irradiated with the laser beam and light generated from a plasma and determines, out of the captured image, a portion having luminance higher than that of surrounding areas to be the laser beam irradiation point (see Patent Literature 2).

CITATION LIST

Patent Literature

Patent Literature 1: Japanese Patent Publication No. 55-18439
Patent Literature 2: Japanese Patent Application Laid-open No. 2000-263266

Non Patent Literature

Non Patent Literature 1: B. K. P. Hron, B. G. Schunck: "Determining optical flow", Artificial Intelligence, vol. 17, pp. 185-203, (1981)

SUMMARY

Technical Problem

The abutting portions of the welding material are not necessarily symmetrical with each other due to, for example, variations in edge shapes of the abutting portions of the welding material and contaminants on the edge portions. Moreover, different surface properties of the welding material result in different reflection factors. Thus, steady detection of the welding position is difficult by simply binarizing the luminance pattern of the observed image. Additionally, the molten pool has an asymmetrical shape, so that the welding position detecting method using a binarized image of the molten pool cannot achieve sufficient detection accuracy.

The plasma emits light through an interaction between metallic vapor rising up from the laser beam irradiation point and the laser beam. Thus, the plasma light emission point does not accurately agree with the laser beam irradiation point. The plasma light emission point also forms an area having a predetermined range. Thus, even with the detected plasma light emission point subjected to image processing, such as binarization and center-of-gravity calculation, the plasma light emission point lacks accuracy in representing the laser beam irradiation point. Moreover, recent laser beam welding techniques generate inherently a smaller amount of plasma, which poses a problem of difficulty in achieving plasma detection through images.

Meanwhile, the method for detecting the laser beam irradiation point through calculation of the luminance of the captured image assumes that the laser beam irradiation point has the highest luminance in the captured image. In reality, however, irregular reflection on the surface of a steel sheet or the like serves as disturbance, which results in the laser beam irradiation point not necessarily having the highest luminance in the captured image. Specifically, the assumption that the laser beam irradiation point has the highest luminance in the captured image lacks reliability.

The present invention has been made in view of the foregoing problems and it is an object of the present invention to provide a welding position detecting apparatus and a welding position detecting method for laser beam welding, the apparatus and the method being capable of detecting the welding position in laser beam welding with high reliability without assuming that a laser beam irradiation point has the highest luminance in a captured image.

Solution to Problem

To solve the problem described above and achieve the object, a welding position detecting apparatus for laser beam welding according to the present invention includes: an imaging device that captures, at a predetermined time interval, images of an irradiated portion of a welding material irradiated with a welding laser beam, and a surrounding area thereof, of a welding material; an image processing device that identifies a position of the irradiated portion irradiated with the welding laser beam by performing image processing calculating, from two or more images acquired by the imaging device, a direction and an amount of parallel movement of points in the images; and a display device that displays the position of the irradiated portion irradiated with the welding laser beam, the position being identified by the image processing device.

To solve the problem described above and achieve the object, a welding position detecting method for laser beam welding according to the present invention includes: imaging, at a predetermined time interval, an irradiated portion irradiated with a welding laser beam, and a surrounding area thereof, of a welding material; identifying a position of the irradiated portion irradiated with the welding laser beam by performing image processing calculating, from two or more images acquired at the imaging, a direction and an amount of parallel movement of points in the images; and displaying the position of the irradiated portion irradiated with the welding laser beam, the position being identified at the identifying.

Advantageous Effects of Invention

The welding position detecting apparatus and the welding position detecting method for laser beam welding according to the aspect of the present invention achieve an effect of being capable of detecting the welding position in laser beam welding with high reliability without assuming that the laser beam irradiation point has the highest luminance in the captured image.

DESCRIPTION OF EMBODIMENTS

A welding position detecting apparatus and a welding position detecting method for laser beam welding according to embodiments of the present invention will be described in detail below with reference to the accompanying drawings. The following describes the welding position detecting apparatus and the welding position detecting method for laser beam welding according to the embodiments of the present invention based on examples of welding in welded steel pipe manufacturing processes. The present invention is nonetheless applicable as appropriate to, not only the welding in the welded steel pipe manufacturing processes, but also any manufacturing process in which, while a welding material is being continuously supplied, abutting portions are welded together.

Welding Position Detecting Apparatus of a First Embodiment

Figure 1:
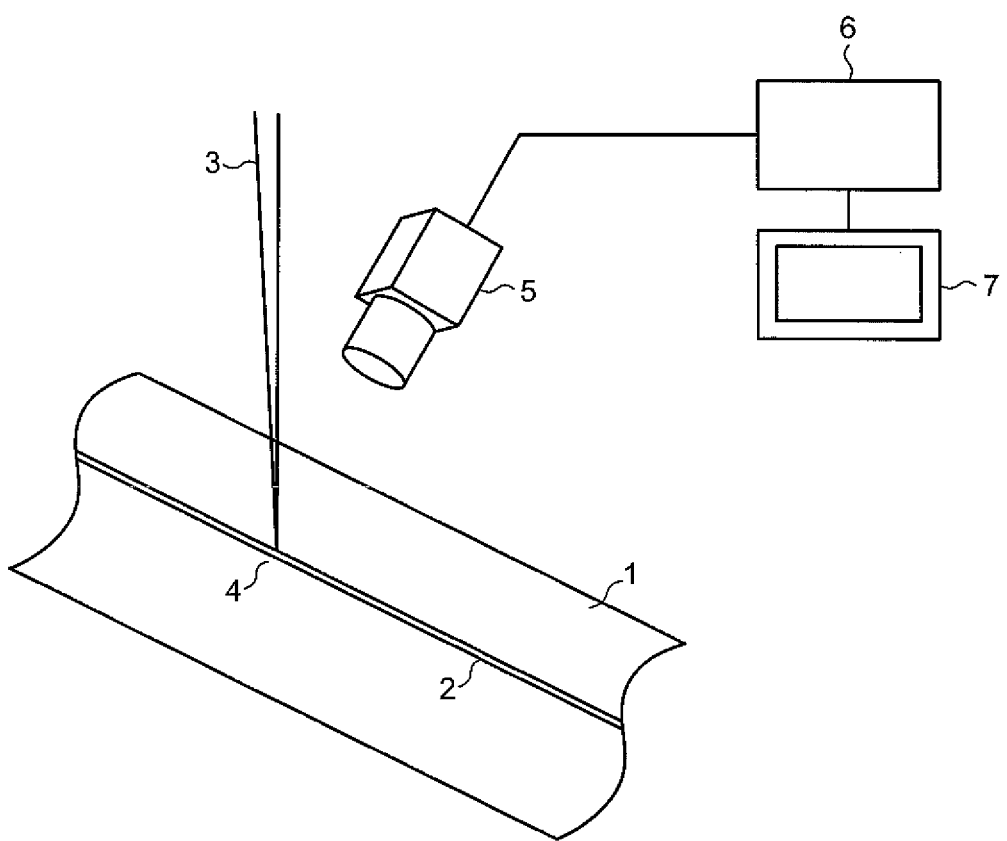
FIG. 1 is a configuration diagram illustrating a welding position detecting apparatus for laser beam welding according to a first embodiment of the present invention.

FIG. 1 is a configuration diagram illustrating a welding position detecting apparatus for laser beam welding according to a first embodiment of the present invention. As illustrated in FIG. 1, the welding position detecting apparatus for laser beam welding according to the first embodiment of the present invention includes an imaging device 5, an image processing device 6, and a display device 7. The imaging device 5 captures an image of an irradiated portion 4 and a surround area thereof, the irradiated portion 4 representing an abutting portion 2 of a welded steel pipe 1 irradiated with a welding laser beam 3. The image processing device 6 performs image processing by synthesizing an image from an image signal acquired by the imaging device 5. The display device 7 displays an image that has undergone the image processing performed by the image processing device 6.

The welded steel pipe 1 illustrated in FIG. 1 is a steel sheet that undergoes a process of being formed into a recess in a width direction by a forming unit and is eventually formed into a cylindrical shape having both edges laser-welded together. Specifically, the abutting portion 2 assumes both edges of the steel plate abutted against each other.

The welding laser beam 3 is a laser beam oscillated by a laser oscillator and transmitted to the irradiated portion 4 by a transmission tube that combines mirrors or the like or a transmission system such as an optical fiber. Understandably, the welding laser beam 3 is preferably condensed by an optical system including a concave mirror and a convex lens as necessary so that energy density can be intensified at the irradiated portion 4.

The imaging device 5 may include a camera generally available on a market as an industrial monitoring camera such as a CCD camera and a CMOS camera. The imaging device 5 is installed with an object lens having a magnification selected so that the imaging device 5 can image the irradiated portion 4 irradiated with the welding laser beam 3 and an area of a 5-to-20-mm square therearound. For convenience sake, the imaging device 5 has a visual field defined such that a longitudinal direction (travel direction) of the welded steel pipe 1 is perpendicular to the visual field and a circumferential direction of the welded steel pipe 1 is horizontal to the visual field. If the position irradiated with the welding laser beam 3 is not moved in the longitudinal direction of the welded steel pipe 1, the present invention can be appropriately embodied even with the visual field in the perpendicular direction of the imaging device 5 falling on about the lower limit (5 mm) of the suitable range. For optical flow calculation described later, however, an identical portion needs to be imaged overlappingly within the visual field for two consecutive images. Thus, preferably, an optical magnification and imaging intervals are set so that more than a half of the visual field in the travel direction overlaps each other.

The image processing device 6 forms an image from the image signal acquired by the imaging device 5, calculates an optical flow distribution described later, and, based on the optical flow distribution, identifies a central position of the irradiated portion 4 irradiated with the welding laser beam 3. Additionally, the image processing device 6 displays the calculated central position of the irradiated portion 4 on the display device 7, while outputting information on the central position of the irradiated portion 4 to a separate laser beam irradiation point driving device.

Optical Flow

The optical flow distribution calculated by the image processing device 6 will be described below.

When the abutting portion 2 of the welded steel pipe 1 is continuously observed with the imaging device 5 having a fixed visual field, the welded steel pipe 1 within the visual field of the imaging device 5 is moved in parallel substantially uniformly in the travel direction and the irradiated portion 4 irradiated with the welding laser beam 3 exhibits behavior different from that of the welded steel pipe 1. Thus, if the abutting portion 2 of the welded steel pipe 1 is imaged twice or more at short time intervals and the two images are compared with each other to thereby discriminate a portion moved in parallel from a portion not moved in parallel, the portion not moved in parallel can be determined to be the irradiated portion 4 irradiated with the welding laser beam 3.

An optical flow method is known as a method for discriminating the portion moved in parallel from the portion not moved in parallel (see Non Patent Literature 1). This optical flow method differentiates numerically a time gradient or a space gradient of the two images to thereby calculate a vector that represents a direction and an amount of the parallel movement of points in the images (what is called a motion vector). The calculation method is mounted using a program, for example, OpenCV.

Image Processing Device

Figure 2:
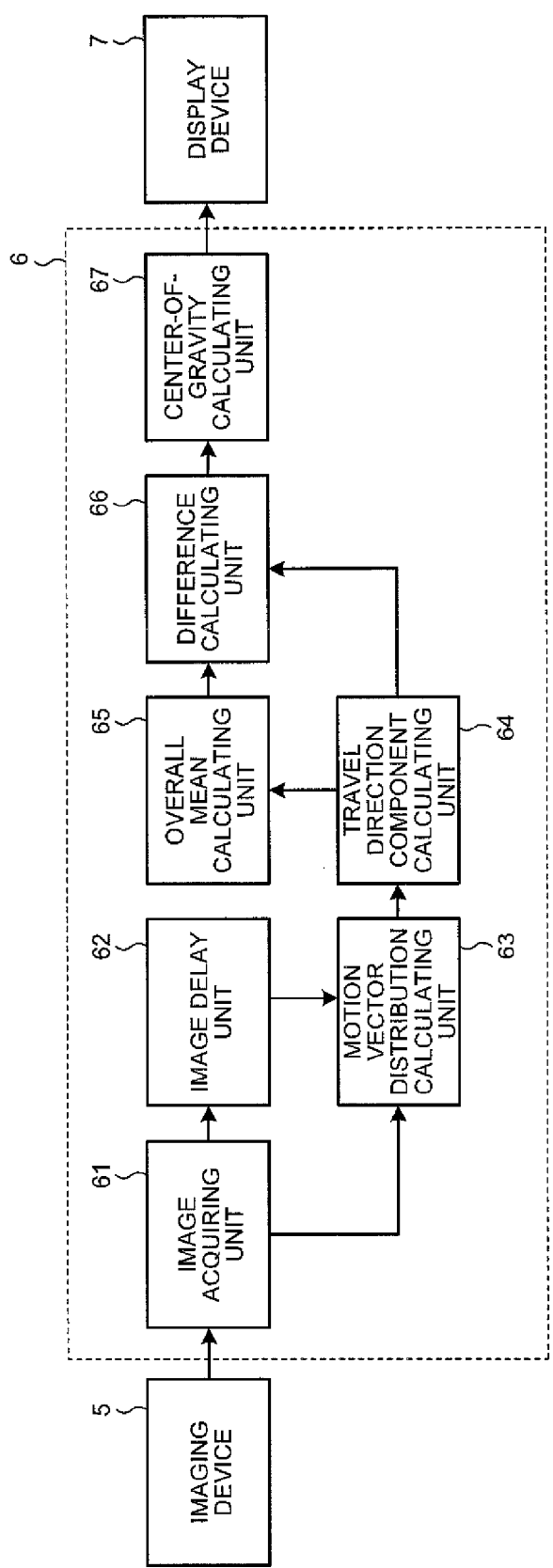
FIG. 2 is a functional block diagram illustrating processing performed by an image processing device.

The image processing device 6 that identifies the position of the irradiated portion 4 irradiated with the welding laser beam 3 using the optical flow method will be described below with reference to FIG. 2. FIG. 2 is a functional block diagram illustrating processing performed by the image processing device 6. It is noted that the present invention may be embodied by mounting the processing performed by the image processing device 6 as software using the above-mentioned OpenCV, as hardware, or as a combination of software and hardware.

As illustrated in FIG. 2, the image processing device 6 includes an image acquiring unit 61, an image delay unit 62, a motion vector distribution calculating unit 63, a travel direction component calculating unit 64, an overall mean calculating unit 65, a difference calculating unit 66, and a center-of-gravity calculating unit 67.

The image acquiring unit 61 forms an image from the image signal acquired by the imaging device 5. If, for example, the image signal input from the imaging device 5 to the image processing device 6 is an analog signal, the image acquiring unit 61 uses an AD converter to convert the image signal to a corresponding digital signal and thereby organizes the image captured by the imaging device 5 into an image frame.

The image delay unit 62 is a frame buffer for temporarily storing therein the image frame organized by the image acquiring unit 61. The optical flow method is a calculation method that uses two images captured at different points in time with time intervals interposed therebetween, and therefore, temporarily storing of one image or two images by the image delay unit 62 enables the two images captured at time intervals to be processed simultaneously.

The motion vector distribution calculating unit 63 calculates an optical flow distribution based on the two image frames temporarily stored in the image delay unit 62 or the two image frames temporarily stored in the image delay unit 62 and the image frame organized by the image acquiring unit 61. Specifically, a time gradient or a space gradient of the two images captured at time intervals is numerically differentiated to calculate a vector associated with points in the images (see FIG. 6). The vector represents a direction and an amount of the parallel movement of points in the images. It is noted that the calculation of the optical flow distribution performed by the motion vector distribution calculating unit 63 may be performed for each of pixels of the image frame or for each having an appropriate size of areas into which the image frame is divided.

The travel direction component calculating unit 64 extracts a component in the perpendicular direction (the travel direction of the welded steel pipe 1) only from the optical flow distribution calculated by the motion vector distribution calculating unit 63. It is noted that the travel direction component calculating unit 64 also has a function of temporarily storing the calculated perpendicular component of the optical flow distribution, because the perpendicular component of the optical flow distribution calculated by the travel direction component calculating unit 64 is used also at a later stage.

The overall mean calculating unit 65 averages the perpendicular component of the optical flow distribution calculated by the travel direction component calculating unit 64. Specifically, the overall mean calculating unit 65 averages the perpendicular component of the vector associated with points in the image, calculated by the travel direction component calculating unit 64, with respect to points in the image and calculates a distribution with which the mean value is associated with points in the image. The calculated mean value corresponds to a travel speed of the welded steel pipe 1.

The difference calculating unit 66 calculates a difference between the perpendicular component of the optical flow distribution calculated by the travel direction component calculating unit 64 and the mean value calculated by the overall mean calculating unit 65 for points in the image (the image obtained from the difference will hereinafter be referred to as a mean deviation chart). Specifically, the difference calculating unit 66 subtracts from the perpendicular component of the optical flow distribution calculated by the travel direction component calculating unit 64 a value that corresponds to the travel speed of the welded steel pipe 1 to thereby extract a portion of behavior different from traveling of the welded steel pipe 1.

The center-of-gravity calculating unit 67 is an irradiated portion identifying unit that calculates a center of gravity from the distribution of difference values calculated by the difference calculating unit 66 and identifies a representative point of the portion of behavior different from traveling of the welded steel pipe 1. Specifically, the number of points at which the difference value calculated by the difference calculating unit 66 is not zero is not necessarily one and these points form an area extending over a certain expansion. Thus, the center-of-gravity calculating unit 67 calculates the center of gravity weighted by the difference values to thereby establish the representative point. The portion of behavior different from traveling of the welded steel pipe 1 should correspond to the irradiated portion 4 irradiated with the welding laser beam 3 as described earlier, so that the representative point calculated by the center-of-gravity calculating unit 67 is the central point of the irradiated portion 4 irradiated with the welding laser beam 3.

Finally, the information on the position of the central point of the irradiated portion 4 irradiated with the welding laser beam 3 calculated by the center-of-gravity calculating unit 67 is transmitted to the display device 7 as described earlier and is displayed on a display screen of the display device 7.

Process of Welding Position Detecting Method

The welding position detecting method for laser beam welding according to the first embodiment of the present invention will be described below with reference to FIG. 3.

Figure 3:
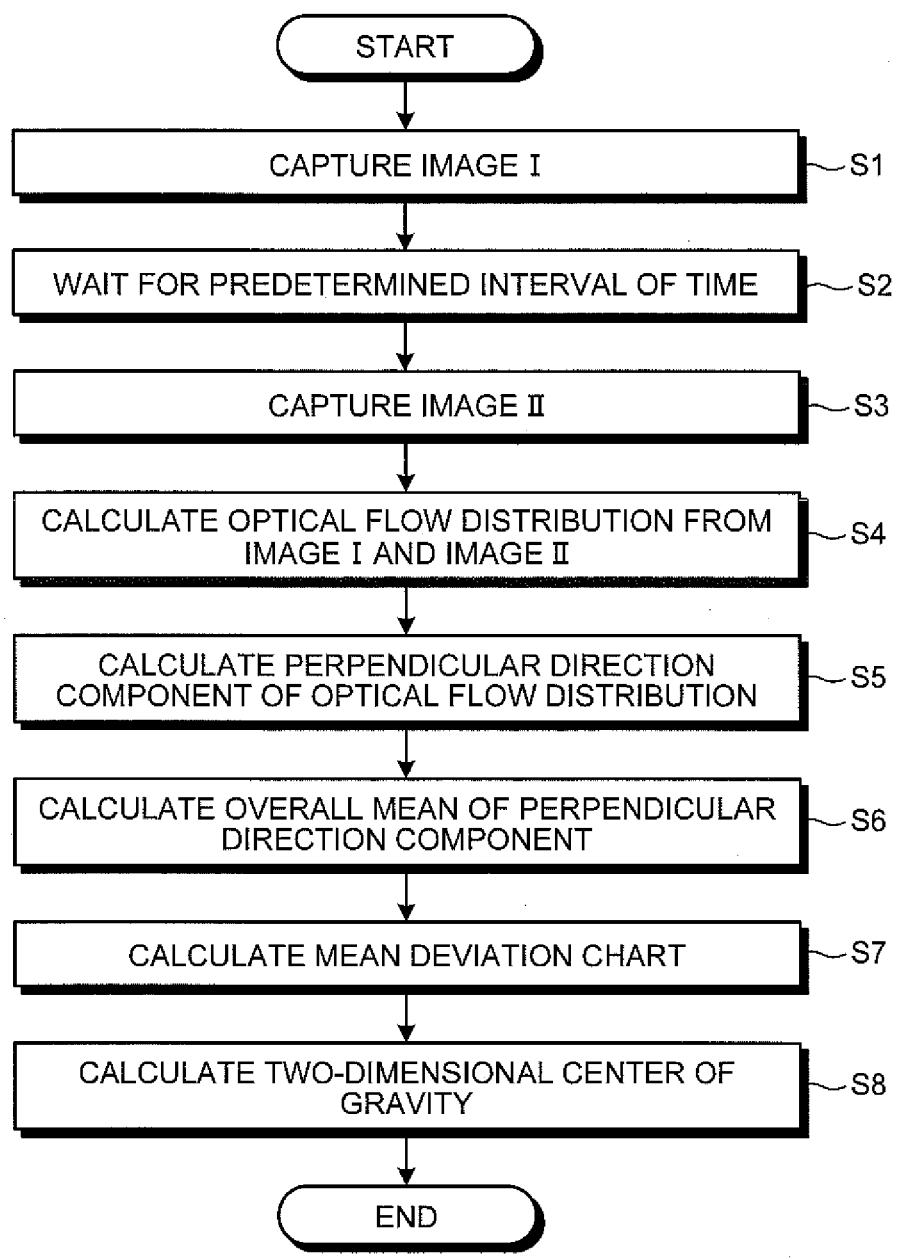
FIG. 3 is a flowchart illustrating a welding position detecting method for laser beam welding according to the first embodiment of the present invention.

FIG. 3 is a flowchart illustrating the welding position detecting method for laser beam welding according to the first embodiment of the present invention. As the first step of the welding position detecting method for laser beam welding according to the embodiment of the present invention, the imaging device 5 captures a first image (hereinafter referred to as image I) of the irradiated portion 4 irradiated with the welding laser beam 3 (Step S1).

After having captured image I, the imaging device 5 waits for a predetermined interval of time (Step S2) before capturing a second image (hereinafter referred to as image II) of the irradiated portion 4 irradiated with the welding laser beam 3 (Step S3).

Thereafter, image I and image II are transmitted to the image processing device 6 and the motion vector distribution calculating unit 63 of the image processing device 6 calculates an optical flow distribution of image I and image II (Step S4). The travel direction component calculating unit 64 of the image processing device 6 calculates a perpendicular direction component of the optical flow distribution (Step S5) and the overall mean calculating unit 65 of the image processing device 6 calculates a mean in the entire image of the perpendicular direction component of the optical flow distribution (Step S6). Then, the difference calculating unit 66 of the image processing device 6 calculates a mean deviation chart from the perpendicular component of the optical flow distribution and the overall mean of the perpendicular component of the optical flow distribution (Step S7).

Finally, the center-of-gravity calculating unit 67 of the image processing device 6 calculates a two-dimensional center of gravity from the mean deviation chart, thereby identifying the central point of the irradiated portion 4 irradiated with the welding laser beam 3 (Step S8).

EXAMPLE

The welding position detecting method for laser beam welding according to the embodiment of the present invention described above will be described below using images captured of the irradiated portion 4 irradiated with the welding laser beam 3 in an actual welded steel pipe 1.

Figure 4:
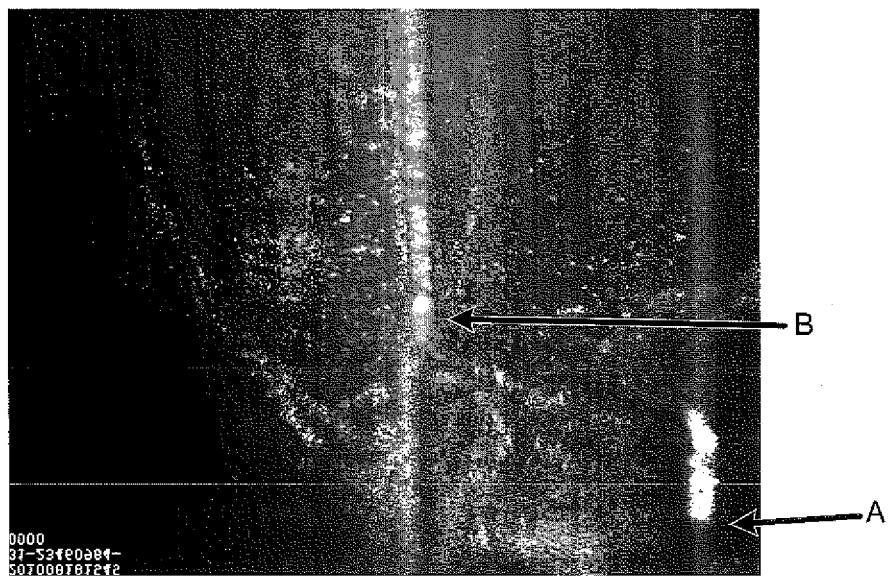
FIG. 4 is an image captured of a welding laser beam irradiated portion and a surrounding area thereof in an actual steel pipe.
Figure 5:
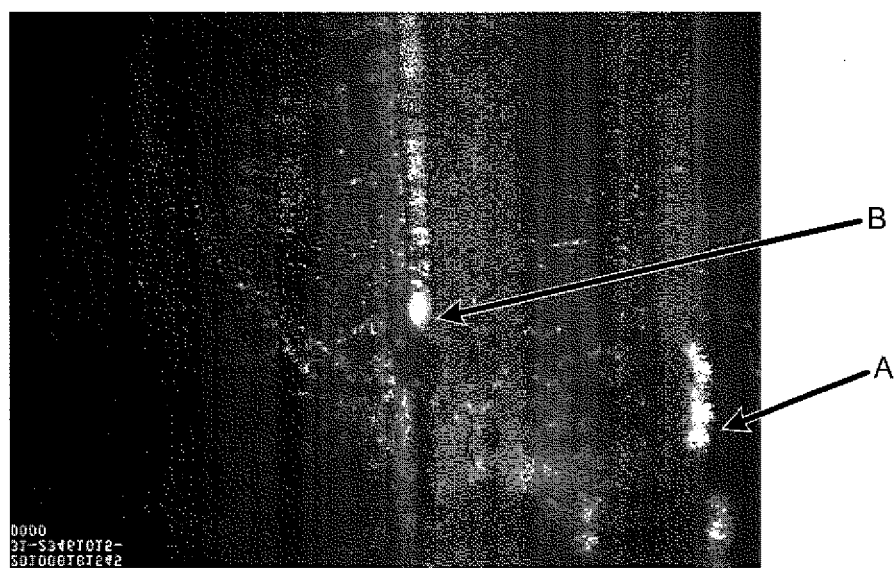
FIG. 5 is an image captured of the welding laser beam irradiated portion and the surrounding area thereof in the actual steel pipe.

FIGS. 4 and 5 are images of two consecutive frames captured of the irradiated portion 4 irradiated with the welding laser beam 3 in the actual welded steel pipe 1 and a surrounding area thereof. Time intervals interposed between the images of the two consecutive frames illustrated in FIGS. 4 and 5 are $1/30$ seconds, the same as video rate. Nonetheless, a movement amount of a particular spot in the steel pipe in the example within the visual field is sufficiently smaller than that within the visual field in the travel direction as is known from the movement of the pattern of the welded steel pipe indicated by an arrow A, thus satisfying conditions for imaging required for optical flow calculations. The image illustrated in FIG. 4 corresponds to image I in the above-described process and the image illustrated in FIG. 5 corresponds to image II in the above-described process.

As is known from comparing FIG. 4 with FIG. 5, whereas the pattern in the welded steel pipe 1 indicated by the arrow A moves as the welded steel pipe 1 travels, the position of the irradiated portion 4 irradiated with the welding laser beam 3 indicated by an arrow B remains stationary.

Figure 6:
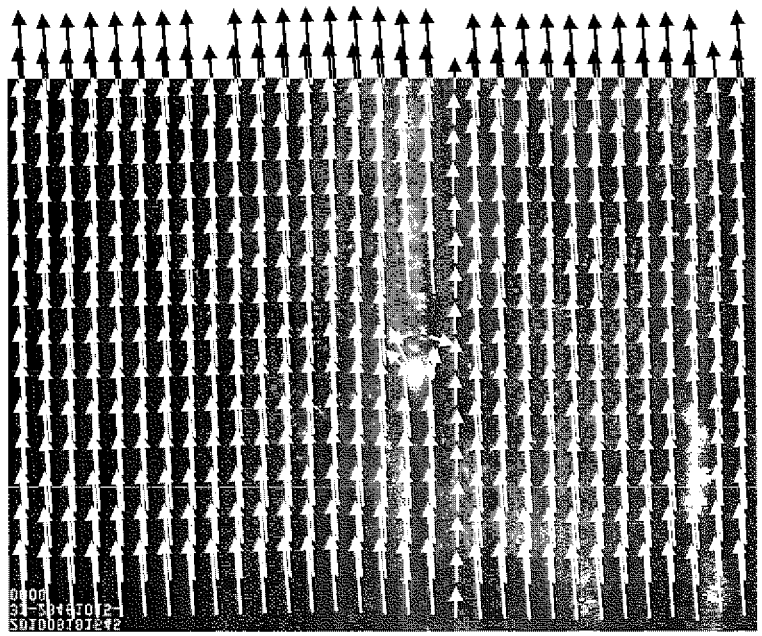
FIG. 6 is the image illustrated in FIG. 5 on which an optical flow distribution is superimposed.

FIG. 6 is the image of FIG. 5 on which an optical flow distribution calculated from the images illustrated in FIGS. 4 and 5 is superimposed. It is noted that the calculation unit used in calculating the optical flow distribution illustrated in FIG. 6 is an area in the images illustrated in FIGS. 4 and 5 divided into 32 parts in the horizontal direction and 24 parts in the vertical direction.

As illustrated in FIG. 6, whereas portions other than the irradiated portion 4 irradiated with the welding laser beam 3 have vectors facing the same direction, the vectors arising from the parallel movement by traveling, the irradiated portion 4 irradiated with the welding laser beam 3 has vectors of a small magnitude and in various directions.

Figure 7:
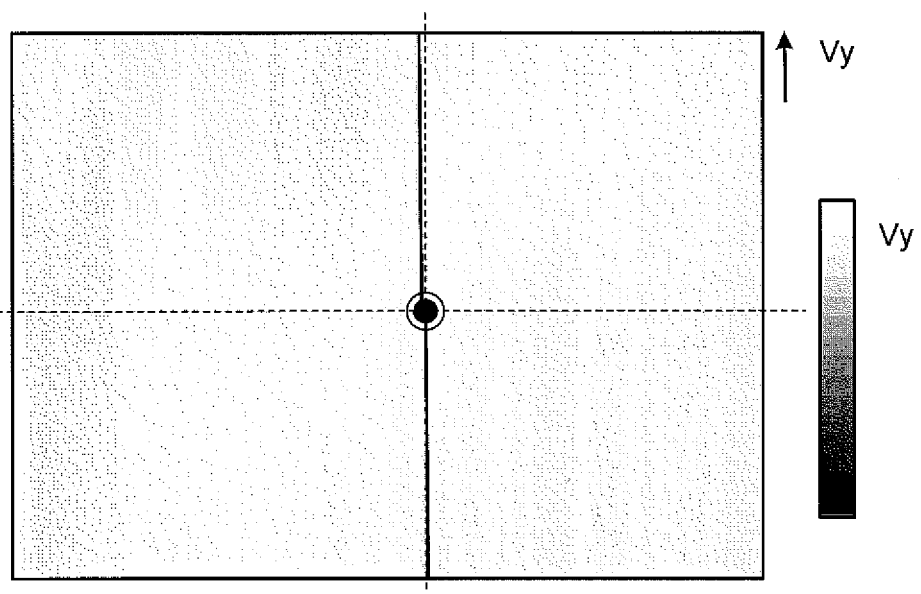
FIG. 7 is a schematic diagram illustrating magnitude of a perpendicular component of the optical flow distribution represented by a density distribution.

FIG. 7 is a schematic diagram illustrating magnitude of the perpendicular component (Vy) of the optical flow distribution illustrated in FIG. 6, represented by a density distribution. As illustrated in FIG. 7, while portions other than the abutting portion 2 of the welded steel pipe 1 exhibit substantially uniform density (specifically, the magnitude of Vy) of the density distribution, the position of the irradiated portion 4 irradiated with the welding laser beam 3 exhibits extremely high density (specifically, Vy is small).

Figure 8:
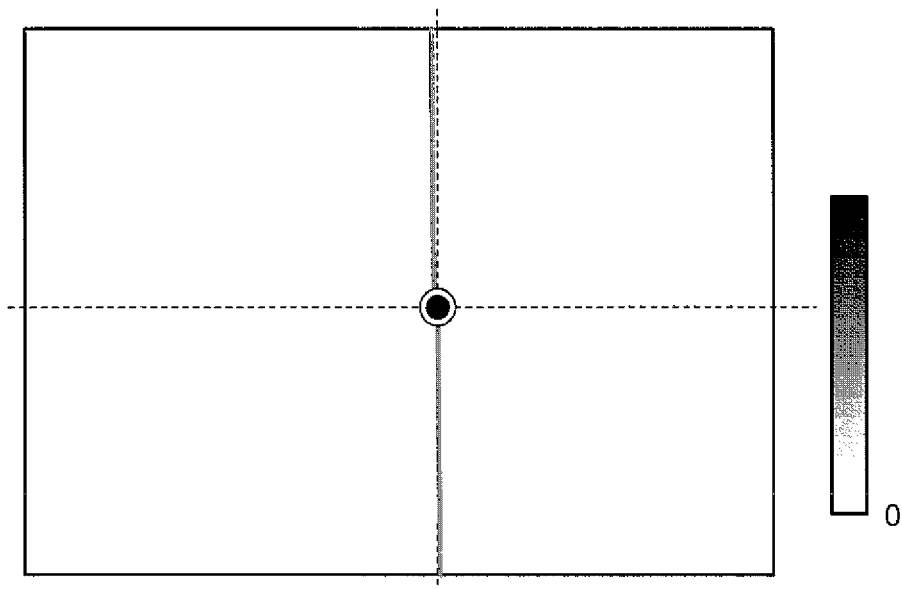
FIG. 8 is a schematic diagram of a mean deviation chart calculated from the perpendicular component of the optical flow distribution and an overall mean of the perpendicular component of the optical flow distribution.

FIG. 8 is a schematic diagram of the mean deviation chart calculated from the perpendicular component of the optical flow distribution and the overall mean of the perpendicular component of the optical flow distribution. The mean deviation chart indicates deviation from the overall mean. Thus, as illustrated in FIG. 8, the value of the irradiated portion 4 irradiated with the welding laser beam 3 is extremely high, although the abutting portion 2 of the welded steel pipe 1 has a certain value. Thus, the mean deviation chart illustrated in FIG. 8 shows that calculating the two-dimensional center of gravity allows the irradiated portion 4 irradiated with the welding laser beam 3 to be identified.

As described heretofore, the welding position detecting apparatus for laser beam welding according to the first embodiment of the present invention includes the imaging device 5 that captures, at a predetermined time interval, images of the irradiated portion 4 irradiated with the welding laser beam 3, and the surrounding area thereof, of the welded steel pipe 1, the image processing device 6 that identifies the position of the irradiated portion 4 irradiated with the welding laser beam 3 by performing image processing calculating, from two or more images acquired by the imaging device 5, a direction and an amount of parallel movement of points in the images, and the display device 7 that displays the position of the irradiated portion irradiated with the welding laser beam 3, the position being identified by the image processing device 6. The welding position detecting apparatus for laser beam welding according to the first embodiment of the present invention can thus detect the welding position in laser beam welding with high reliability without assuming that the laser beam irradiation point has the highest luminance in the captured image.

Welding Position Detecting Apparatus of a Second Embodiment

Figure 9:
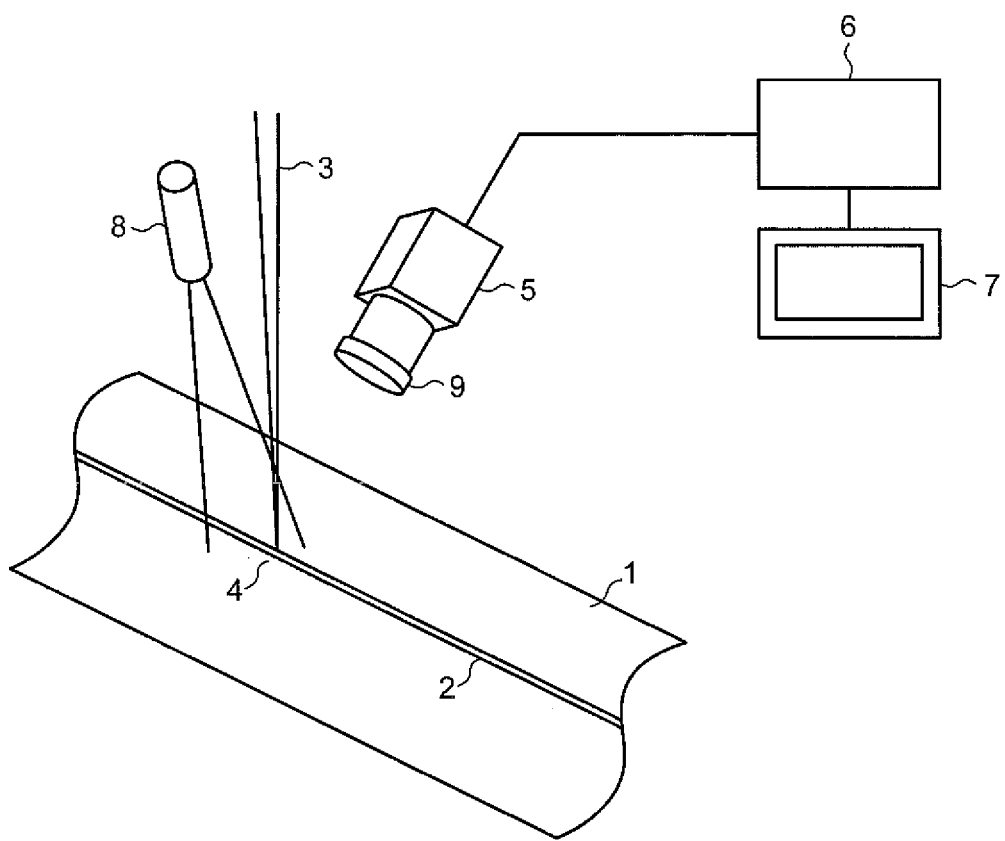
FIG. 9 is a configuration diagram illustrating a welding position detecting apparatus for laser beam welding according to a second embodiment of the present invention.

FIG. 9 is a configuration diagram illustrating a welding position detecting apparatus for laser beam welding according to a second embodiment of the present invention. As illustrated in FIG. 9, the welding position detecting apparatus for laser beam welding according to the second embodiment of the present invention includes an imaging device 5, an image processing device 6, a display device 7, a single-wavelength optical source 8, and a band-pass filter 9. The imaging device 5 captures an image of an irradiated portion 4 and an a surround area thereof, the irradiated portion 4 representing an abutting portion 2 of a welded steel pipe 1 irradiated with a welding laser beam 3. The image processing device 6 performs image processing by synthesizing an image from an image signal acquired by the imaging device 5. The display device 7 displays an image that has undergone the image processing performed by the image processing device 6. The single-wavelength optical source 8 illuminates the irradiated portion 4. The band-pass filter 9 is disposed at a front stage of the imaging device 5, the band-pass filter 9 having a transmission property of transmitting light having the wavelength of the single-wavelength optical source 8.

As illustrated in FIG. 9, the welding position detecting apparatus for laser beam welding according to the second embodiment of the present invention includes elements that are found also in the welding position detecting apparatus for laser beam welding according to the first embodiment of the present invention. Thus, the welding position detecting apparatus for laser beam welding according to the second embodiment of the present invention will be described except for those elements commonly found in the first and the second embodiments.

The single-wavelength optical source 8 illuminating the irradiated portion 4 emits light with a single wavelength ranging from 800 nm to 900 nm. A white light source having a wavelength restricted by a band-pass filter may be used for the single-wavelength optical source 8. Preferably, however, a semiconductor laser optical source is used for its compactness and capability of emitting intensified light. For example, an 808-nm infrared-ray laser diode may be used as the optical source emitting light with a single wavelength ranging from 800 nm to 900 nm.

A thin-film dielectric interference filter or any other commonly marketed filter may be used for the band-pass filter 9 that is disposed at a front stage of the imaging device 5 and that has a transmission property of transmitting light having the wavelength of the single-wavelength optical source 8. If a white light source having a wavelength restricted by a band-pass filter is used for the single-wavelength optical source 8 and if this band-pass filter is of the same type as that of the band-pass filter 9 disposed at the front stage of the imaging device 5, the requirement of having the transmission property of transmitting light having the wavelength of the single-wavelength optical source 8 is automatically satisfied.

The reason why an optical source emitting light with a single wavelength ranging from 800 nm to 900 nm is preferably used for the single-wavelength optical source 8 will be described below with reference to FIG. 10.

Figure 10:
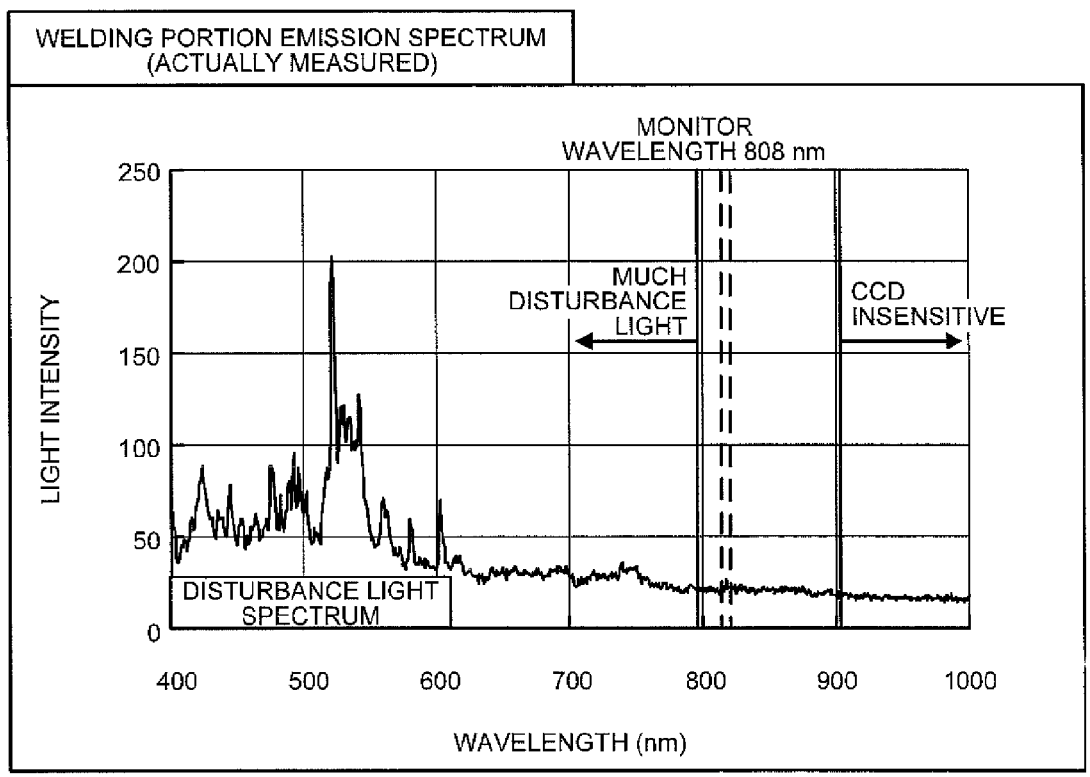
FIG. 10 is a graph illustrating light intensity as a result of actually measuring an emission spectrum of a welding portion of the steel pipe.

FIG. 10 is a graph illustrating light intensity as a result of actually measuring an emission spectrum of a welding portion of the welded steel pipe 1. A luminous phenomenon serving as disturbance occurs in welding as illustrated in FIG. 10. Factors causing such a luminous phenomenon include plasma and welding fumes. The plasma generates disturbance light through an interaction between metallic vapor rising up from the laser beam irradiation point and the laser beam. The welding fumes are fine mineral particles produced when vaporized metal produced during welding rapidly is cooled to condense in the air. The welding fumes likewise generate disturbance light through the interaction of the laser beam. The disturbance light contains a number of components having a light-emitting wavelength of 800 nm or shorter.

Meanwhile, a CCD camera, for example, included in the imaging device 5 has imaging sensitivity reduced in an infrared-ray region of a wavelength of 900 nm or longer. Thus, the welding position detecting apparatus for laser beam welding according to the second embodiment of the present invention includes as the single-wavelength optical source 8 an optical source that emits light with a single wavelength ranging from 800 nm to 900 nm.

It is noted that a welding position detecting method for laser beam welding using the welding position detecting apparatus for laser beam welding according to the second embodiment of the present invention performs the same process as that of the welding position detecting method for laser beam welding using the welding position detecting apparatus for laser beam welding according to the first embodiment and thus a description therefor will be omitted.

As described heretofore, the welding position detecting apparatus for laser beam welding according to the second embodiment of the present invention includes the imaging device 5 that captures, at a predetermined time interval, images of the irradiated portion 4 irradiated with the welding laser beam 3, and the surrounding area thereof, of the welded steel pipe 1, the image processing device 6 that identifies the position of the irradiated portion 4 irradiated with the welding laser beam 3 by performing image processing calculating, from two or more images acquired by the imaging device 5, a direction and an amount of parallel movement of points in the images, the display device 7 that displays the position of the irradiated portion irradiated with the welding laser beam 3, the position being identified by the image processing device 6, the single-wavelength optical source 8 that irradiates the irradiated portion 4 and the surrounding area thereof of the welded steel pipe 1 with light having a single wavelength ranging from 800 nm to 900 nm, and the band-pass filter 9 disposed between the imaging device 5 and the irradiated portion 4, the band-pass filter 9 having a transmission property of transmitting light having the wavelength of the single-wavelength optical source 8. The welding position detecting apparatus for laser beam welding according to the second embodiment of the present invention can thus detect the welding position in laser beam welding with high reliability without assuming that the laser beam irradiation point has the highest luminance in the captured image, while reducing effects from disturbance such as the plasma and the welding fumes.

INDUSTRIAL APPLICABILITY

As described heretofore, the welding position detecting apparatus and the welding position detecting method for laser beam welding according to the embodiments of the present invention are useful in detecting welding positions in laser beam welding and particularly suitable for detecting welding positions in laser beam welding in the manufacture of welded steel pipes.

REFERENCE SIGNS LIST 1 welded steel pipe
2 abutting portion
3 welding laser beam
4 irradiated portion
5 imaging device
6 image processing device
7 display device
8 single-wavelength optical source
9 band-pass filter
61 image acquiring unit
62 image delay unit
63 motion vector distribution calculating unit
64 travel direction component calculating unit
65 overall mean calculating unit
66 difference calculating unit
67 center-of-gravity calculating unit

The invention claimed is:

1. A welding position detecting apparatus for laser beam welding, the welding position detecting apparatus comprising:
    an imaging device that captures, at a predetermined time interval, images of an irradiated portion of a welding material irradiated with a welding laser beam, and a surrounding area thereof, of a welding material;
    an image processing device that identifies a position of the irradiated portion irradiated with the welding laser beam by performing image processing calculating, from two or more images acquired by the imaging device, a direction and an amount of parallel movement of points in the images; and
    a display device that displays the position of the irradiated portion irradiated with the welding laser beam, the position being identified by the image processing device.

2. The welding position detecting apparatus for laser beam welding according to claim 1, further comprising:
    a single-wavelength optical source that irradiates the irradiated portion, and the surrounding area thereof, of the welding material with light having a single wavelength ranging from 800 nm to 900 nm; and
    a band-pass filter disposed between the imaging device and the irradiated portion, the band-pass filter having a transmission property of transmitting light having the wavelength of the single-wavelength optical source.

3. The welding position detecting apparatus for laser beam welding according to claim 2, wherein
    the image processing device comprises:
    a motion vector distribution calculating unit that calculates, from two or more images acquired by the imaging device, a distribution of the direction and the amount of parallel movement of points in the images;
    a travel direction component calculating unit that calculates, from the distribution of the direction and the amount of parallel movement of the points, a travel direction component of the welding material;
    an overall mean calculating unit that calculates a travel speed component of the welding material by calculating a mean of the distribution of the direction and the amount of parallel movement of the points relative to an entire image of the travel direction component of the welding material;
    a difference calculating unit that acquires a mean deviation by calculating a difference between the distribution of the direction and the amount of parallel movement of the points and the travel speed component of the welding material; and
    an irradiated portion identifying unit that identifies, from the mean deviation, the position of the irradiated portion irradiated with the welding laser beam.

4. The welding position detecting apparatus for laser beam welding according to claim 1, wherein
    the image processing device comprises:
    a motion vector distribution calculating unit that calculates, from two or more images acquired by the imaging device, a distribution of the direction and the amount of parallel movement of points in the images;
    a travel direction component calculating unit that calculates, from the distribution of the direction and the amount of parallel movement of the points, a travel direction component of the welding material;
    an overall mean calculating unit that calculates a travel speed component of the welding material by calculating a mean of the distribution of the direction and the amount of parallel movement of the points relative to an entire image of the travel direction component of the welding material;
    a difference calculating unit that acquires a mean deviation by calculating a difference between the distribution of the direction and the amount of parallel movement of the points and the travel speed component of the welding material; and
    an irradiated portion identifying unit that identifies, from the mean deviation, the position of the irradiated portion irradiated with the welding laser beam.

5. A welding position detecting method for laser beam welding, the welding position detecting method comprising:
    imaging, at a predetermined time interval, an irradiated portion irradiated with a welding laser beam, and a surrounding area thereof, of a welding material;
    identifying a position of the irradiated portion irradiated with the welding laser beam by performing image processing calculating, from two or more images acquired at the imaging, a direction and an amount of parallel movement of points in the images; and
    displaying the position of the irradiated portion irradiated with the welding laser beam, the position being identified at the identifying.

* * * * *